(12) United States Patent    (10) Patent No.: US 8,769,328 B2
Stedman et al.    (45) Date of Patent: *Jul. 1, 2014

(54) SYSTEM AND METHOD OF UTILIZING RESOURCES WITHIN AN INFORMATION HANDLING SYSTEM

(75) Inventors: Roy W. Stedman, Austin, TX (US); Andrew T. Sultenfuss, Leander, TX (US); David Loadman, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/567,494

(22) Filed: Aug. 6, 2012
(Under 37 CFR 1.47)

(65) Prior Publication Data

US 2012/0303984 A1    Nov. 29, 2012

Related U.S. Application Data

(63) Continuation of application No. 12/261,797, filed on Oct. 30, 2008, now Pat. No. 8,370,673.

(51) Int. Cl.
*G06F 1/00* (2006.01)
(52) U.S. Cl.
USPC .......................................... 713/330; 713/300
(58) Field of Classification Search
USPC ....................................................... 713/300
See application file for complete search history.

(56) References Cited

U.S. PATENT DOCUMENTS

| | | | |
|---|---|---|---|
| 4,720,798 A | 1/1988 | Reed et al. | |
| 4,747,041 A | 5/1988 | Engel et al. | |
| 4,809,163 A | 2/1989 | Hirosawa et al. | |
| 5,251,320 A | 10/1993 | Kuzawinski et al. | |
| 5,303,171 A | 4/1994 | Belt et al. | |
| 5,586,270 A | 12/1996 | Rotier et al. | |
| 5,644,760 A | 7/1997 | Polzin et al. | |
| 5,727,231 A | 3/1998 | Bartley et al. | |
| 5,748,912 A | 5/1998 | Lee | |

(Continued)

FOREIGN PATENT DOCUMENTS

| | | |
|---|---|---|
| EP | 1460529 A2 | 9/2004 |
| WO | 2007004178 A1 | 1/2007 |

OTHER PUBLICATIONS

"Platform-based Power Management and Linux," Garbee et al., HP Development Company, 2010.

(Continued)

*Primary Examiner* — Paul R Myers
*Assistant Examiner* — Christopher a Daley
(74) *Attorney, Agent, or Firm* — Larson Newman, LLP

(57) ABSTRACT

A method of utilizing an information handling system includes detecting an event by a state controller configured to enable a plurality of operating states for a host system including a host system power on state and a host system power off state, and a plurality of processing module operating states including a processing module power on state and a processing module reduced operating state, and enabling an operating state associated with the event, including enabling the processing module power on state where the processing module controls a shared resource and a processing module non-shared resource in response to detecting a processing module power on event, and enabling the processing module reduced operating state where the processing module controls the shared resource in response to detecting a processing module reduced operating event.

20 Claims, 12 Drawing Sheets

(56) References Cited

U.S. PATENT DOCUMENTS

| | | | |
|---|---|---|---|
| 5,919,264 A | 7/1999 | Reneris | |
| 5,978,923 A * | 11/1999 | Kou | 713/323 |
| 5,999,997 A | 12/1999 | Pipes | |
| 6,029,211 A | 2/2000 | Nakashima | |
| 6,078,967 A | 6/2000 | Fulghum | |
| 6,131,166 A * | 10/2000 | Wong-Insley | 713/300 |
| 6,233,692 B1 | 5/2001 | Villanueva | |
| 6,549,968 B1 | 4/2003 | Hart | |
| 6,586,849 B2 | 7/2003 | Tarr | |
| 6,608,400 B1 | 8/2003 | Muehsam | |
| 6,732,216 B2 | 5/2004 | Shaw | |
| 6,735,663 B2 | 5/2004 | Watts, Jr. | |
| 6,735,708 B2 | 5/2004 | Watts, Jr. | |
| 6,760,852 B1 | 7/2004 | Gulick | |
| 6,801,974 B1 | 10/2004 | Watts, Jr. et al. | |
| 6,816,925 B2 | 11/2004 | Watts, Jr. | |
| 6,898,727 B1 | 5/2005 | Wang et al. | |
| 6,993,669 B2 | 1/2006 | Sherburne, Jr. | |
| 7,039,819 B1 * | 5/2006 | Kommrusch et al. | 713/322 |
| 7,076,646 B2 * | 7/2006 | Chang | 713/1 |
| 7,149,837 B2 | 12/2006 | Watts, Jr. et al. | |
| 7,197,584 B2 | 3/2007 | Huber et al. | |
| 7,249,270 B2 | 7/2007 | Mansell et al. | |
| 7,254,730 B2 * | 8/2007 | Kardach et al. | 713/323 |
| 7,278,041 B2 * | 10/2007 | Piel et al. | 713/330 |
| 7,281,148 B2 | 10/2007 | Munguia | |
| 7,380,142 B2 | 5/2008 | Lee et al. | |
| 7,398,408 B2 | 7/2008 | Paljug | |
| 7,640,041 B2 | 12/2009 | Ragan | |
| 7,917,784 B2 * | 3/2011 | de Cesare et al. | 713/320 |
| 7,921,239 B2 | 4/2011 | Stedman et al. | |
| 7,962,921 B2 | 6/2011 | James et al. | |
| 7,979,097 B2 | 7/2011 | Hussain | |
| 8,041,968 B2 | 10/2011 | Tupman | |
| 2002/0103005 A1 | 8/2002 | Watts, Jr. et al. | |
| 2003/0110306 A1 | 6/2003 | Bailis et al. | |
| 2004/0088262 A1 | 5/2004 | Boucher et al. | |
| 2004/0160435 A1 | 8/2004 | Cui et al. | |
| 2005/0066207 A1 * | 3/2005 | Fleck et al. | 713/320 |
| 2005/0122927 A1 | 6/2005 | Wentink | |
| 2005/0239518 A1 | 10/2005 | D'Agostino et al. | |
| 2005/0240702 A1 | 10/2005 | Kunkel et al. | |
| 2006/0026447 A1 | 2/2006 | Naveh et al. | |
| 2007/0094435 A1 | 4/2007 | Fry et al. | |
| 2007/0123347 A1 | 5/2007 | Ragan | |
| 2007/0213105 A1 | 9/2007 | Huber et al. | |
| 2008/0004889 A1 | 1/2008 | Edwards et al. | |
| 2008/0070593 A1 | 3/2008 | Altman et al. | |
| 2008/0138267 A1 | 6/2008 | Yadav | |
| 2008/0140872 A1 | 6/2008 | Wright | |
| 2008/0177154 A1 | 7/2008 | Hansen et al. | |
| 2008/0272880 A1 | 11/2008 | Sutardja et al. | |
| 2009/0125732 A1 | 5/2009 | Oya et al. | |
| 2009/0222832 A1 | 9/2009 | Sultenfuss | |
| 2009/0292933 A1 | 11/2009 | Livni et al. | |
| 2010/0033433 A1 | 2/2010 | Utz et al. | |
| 2010/0033629 A1 | 2/2010 | Utz et al. | |
| 2010/0036983 A1 | 2/2010 | Utz et al. | |
| 2010/0107238 A1 | 4/2010 | Stedman et al. | |
| 2010/0115050 A1 | 5/2010 | Sultenfuss et al. | |
| 2010/0115303 A1 | 5/2010 | Stedman et al. | |

OTHER PUBLICATIONS

"Power Regulator for ProLiant," Hewlett-Packard, Technology Overview, Revision 2, Jun. 2005.

"Total System Power, Evaluating the Power Profile of FPGAs" Actel Corporation, 2008.

Carlson et al. SmartReflex Power and Performance Management Technologies: reduced power consumption, optimized performance, White Paper, Feb. 2008.

Pering et al. CooiSpots: Reducing the Power Consumption of Wireless Mobile Devices with Multiple Radio Interfaces, ACM, 2006.

NVIDIA Corporation. Variable SMP—A Multi-Core CPU Architecture for Low Power and High Performance, Whitepaper, 2011.

* cited by examiner

SYSTEM AND METHOD OF UTILIZING RESOURCES WITHIN AN INFORMATION HANDLING SYSTEM

CROSS REFERENCE TO RELATED APPLICATIONS

This application is a continuation of U.S. patent application Ser. No. 12/261,797, entitled "System and Method of Utilizing Resources within an Information Handling System," filed on Oct. 30, 2008, the disclosure of which is hereby expressly incorporated by reference in its entirety.

FIELD OF THE DISCLOSURE

This disclosure relates generally to information handling systems, and more particularly to a system and method of utilizing resources within an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can be configured to use a variety of hardware and software components that can be configured to process, store, and communicate information and can include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
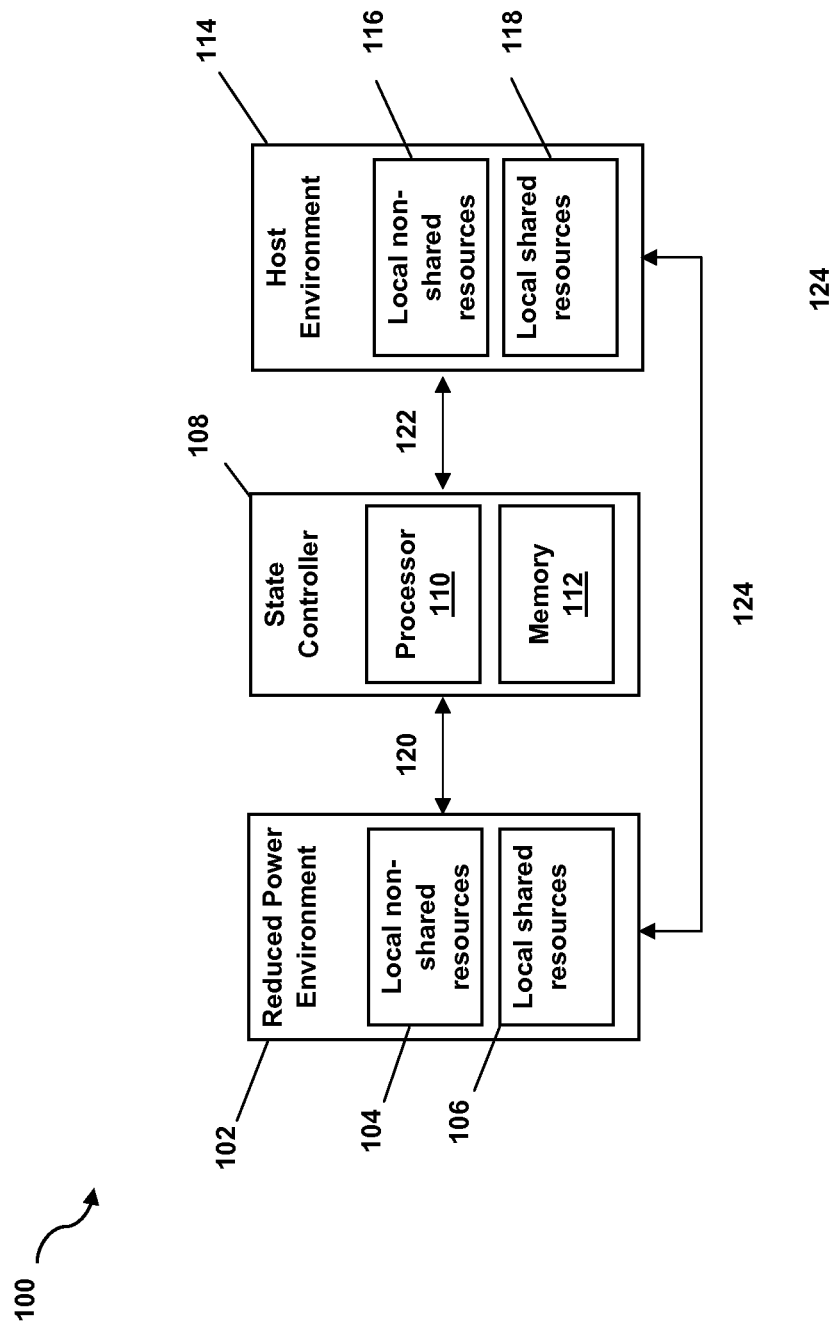
FIG. 1 illustrates a functional block diagram of an information handling system employing a reduced power environment and a host environment according to an aspect of the disclosure.

The following description in combination with the figures is provided to assist in understanding the teachings disclosed herein. The following discussion will focuses on specific implementations and embodiments. This focus is provided to assist in describing the teachings and should not be interpreted as a limitation on the scope or applicability of the teachings. However, other teachings can certainly be used in this application. The teachings can also be used in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

Portions of an information handling system, when referred to as a "device," a "module," or the like, can be configured as hardware, software (which can include firmware), or any combination thereof. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). Similarly, the device could be software, including firmware embedded at a device, such as a Pentium class or PowerPC™ brand processor, or other such device, or software capable of operating a relevant environment of the information handling system. The device could also be a combination of any of the foregoing examples of hardware or software. Note that an information handling system can include an integrated circuit or a board-level product having portions thereof that can also be any combination of hardware and software.

Devices or programs that are in communication with one another need not be in continuous communication with each other unless expressly specified otherwise. In addition, devices or programs that are in communication with one another may communicate directly or indirectly through one or more intermediaries.

Embodiments discussed below describe, in part, distributed computing solutions that manage all or part of a communicative interaction between network elements. In this context, a communicative interaction may be intending to send information, sending information, requesting information, receiving information, receiving a request for information, or any combination thereof. As such, a communicative interaction could be unidirectional, bidirectional, multi-directional, or any combination thereof. In some circumstances, a communicative interaction could be relatively complex and involve two or more network elements. For example, a communicative interaction may be "a conversation" or series of related communications between a client and a server—each network element sending and receiving information to and from the other. The communicative interaction between the network elements is not necessarily limited to only one specific form. A network element may be a node, a piece of hardware, software, firmware, middleware, another component of a computing system, or any combination thereof.

In the description below, a flow charted technique may be described in a series of sequential actions. Unless expressly stated to the contrary, the sequence of the actions and the party performing the actions may be freely changed without departing from the scope of the teachings. Actions may be added, deleted, or altered in several ways. Similarly, the actions may be re-ordered or looped. Further, although processes, methods, algorithms or the like may be described in a sequential order, such processes, methods, algorithms, or any combination thereof may be operable to be performed in alternative orders. Further, some actions within a process, method, or algorithm may be performed simultaneously during at least a point in time (e.g., actions performed in parallel), can also be performed in whole, in part, or any combination thereof.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for that one device.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

To the extent not described herein, many details regarding specific materials, processing acts, and circuits are conventional and may be found in textbooks and other sources within the computing, electronics, and software arts.

An information handling system and method of using it are described below. An exemplary, non-limiting system description is described before addressing methods of using it. Some of the functionality of modules within the system is described with the system. The utility of the system and its modules will become more apparent with the description of the methods that follow the description of the system and modules.

In a particular form, a method of utilizing an information handling system is disclosed. In a particular form, a method of utilizing an information handling system can include detecting an operating state controllable by a state controller configured to enable a plurality of operating environments including a host environment and a reduced power environment. The method can also include detecting an event operable to alter the operating state to enable an operating environment of the plurality of operating environments. According to an aspect, the operating environment can be used separate from a host system operable to enable the host environment.

According to another aspect of the disclosure, a state controller is disclosed. The state controller can include a memory logic configurable to store a state entries operable to be used to enable an operating state of a host system and a reduced power environment. The state controller can also include a processor configured to enable a host environment using the host system, and enable the host environment control of a resource of the reduced power environment. The state controller can further disable the host environment control of the resource of the reduced power environment in response to a request to enable the reduced power environment, and disable the host environment in response to the request to enable the reduced power environment. The state controller can further enable the reduced power environment, and enable the reduced power environment control of a resource of the host environment. The state controller can also disable the reduced power environment control of the resource of the host environment in response to a request to enable the host environment.

According to another aspect, an information handling system is disclosed. The information handling system can include an information handling system comprising a host system configurable to enable a host environment operable to use a shared resource and a host environment non-shared resource, and a processing module configurable to enable a reduced power environment operable to use the shared resource and a reduced power environment non-shared resource. The information handling system can also include a state controller configurable to enable the host environment using the host system, and enable the host environment control of a shared resource of the reduced power environment. The state controller can also disable the host environment control of the shared resource of the reduced power environment in response to a request to enable the reduced power environment, and disable the host environment in response to the request to enable the reduced power environment. The state controller can further enable the reduced power environment using the processing module, and enable the processing module control of the shared resource of the host environment. The state controller can also disable the processing module control of the shared resource of the host environment in response to a request to enable the host environment.

FIG. 1 illustrates a functional block diagram of an information handling system employing a reduced power environment and a host environment. The information handling system, generally illustrated at 100, can also be realized, in whole or in part, as the information handling system 200 illustrated in FIG. 2, the information handling system 1200 illustrated in FIG. 12, other information handling systems not expressly illustrated or described, or any combination thereof.

According to an aspect, the information handling system 100 can include a reduced power environment 102 including local non-shared resources 104 and local shared resources 106. Local non-shared resources 104 can include local memory, floating point CPU capabilities, instructions, fetch routines, a primary operating system, other primary operating modules, security devices, primary applications, power system, regulation modules and circuits, applications that are also capable of being used during low power processing, and other resources that are used as primary resources during a run time of the information handling system 100, or any combination thereof.

Local shared resources 106 can include can include can include video, primary and secondary displays, keyboard, radio, touchpad, credentials, buses, applications that are also capable of being used during low power processing, thermal cooling and cooling systems, a backlight control of a display, touchpad, point stick, common buses, external I/O, disk drives, optical drives, batteries, I/O expander modules, smart card readers, and any combination thereof. The information handling system 100 can also include a state controller 108 including a processor 110 and a memory 112. The information handling system 100 can also include a host environment 114 having local non-shared resources 116 and local shared resources 118.

According to an aspect, local non-shared resources 116 can include can include can include local memory, floating point CPU capabilities, instructions, fetch routines, a primary operating system, other primary operating modules, security devices, primary applications, power system, regulation modules and circuits, applications that are also capable of being used during low power processing, and other resources that are used as resources during a low-power processing of the information handling system 100, or any combination thereof.

According to an aspect, the local shared resources 118 can include can include resources that can be accessed during a run time of the information handling system 100, and during a run time of the LPPS module 114. The local shared resources 118 can include radio, video, storage, I/O ports, buses, context data, credentials, keyboard, biometrics, or any combination thereof.

According to another aspect, the local shared resources 118 can also include radio emulations, transcoders, encryption applications, GPS applications, biometric applications, camera applications, USB concentrator applications, VOIP applications, persistent hardware assisted virtual management, wake events, system management applications, various other peripheral resource applications and devices, or any combination thereof. The reduced power environment 102 can be coupled to the state controller 108 using a link 120. The link 120 can include various types of communication buses, control buses, data links, system buses, or any combination thereof. The state controller 108 can also be coupled to the host environment 114 using a link 122. The link 122 can include various types of communication buses, control buses, data links, system buses, or any combination thereof. Further, the host environment 114 can be coupled to the rescued power environment 102 using a link 124. The link 124 can include various types of communication buses, control buses, data links, system buses, or any combination thereof.

According to an aspect, the state controller 108 can monitor activities of the host environment 114 and the reduced power environment 102 and activate and deactivate resources as needed or desired. According to an aspect, the memory 112 can store logic configurable to alter use of the resources 104, 106, 116, 118 during use the reduced power environment 102 and the host environment 122. For example, the state controller 108 can selectively enable and disable resources of the host environment 114 based on a desired environment. For example, the host environment 104 can be placed in a reduced operating state that can include powering down a host processor (not illustrated) and various other power consuming components, devices, etc. The reduced operating state can also include a hibernate state, a standby state, an off state, or various other reduced operating states as needed or desired. Additionally, the reduced power environment 102 can also be placed in a reduced operating state, such as a hibernate state, a standby state, an off state, or various other reduced operating states as needed or desired.

According to another aspect, the state controller 108 can detect events that can alter the operating state of the reduced power operating environment 102 and the host environment 114. For example, the state controller 108 can initiate disabling a local non-shared resource 118 that may be enabled within the host environment 114, prior to enabling used of the reduced power environment. For example, the state controller can detect an operating status of the local non-shared resource 116 and disable the resources. Similarly, local shared resources 118 that may be enabled prior to the reduced power environment 102 being enabling can remain enabled. For example, the reduced power environment 102 can be initiated and the state controller 108 can detect whether the resource may be enabled, and the resource can remain enabled and accessible to the reduced power environment. Enabling and disabling of resources need not be limited to resources 116 and 118 and can also include modules, components, shared resources, non-shared resources, or any combination thereof that may be accessible to the information handling system 100. Additionally, the state controller 108 can enabled and disable resources 104, 106 of the reduced power environment when enabling an operating state of the host environment 114. For example, one or more local shared resources 106 of the reduced power environment 102 can be enabled, or remain enabled, and access by the host environment 114 as needed or desired.

According to an aspect, the reduced power environment 102 and the host environment 114 can maintain eminent domain over one or more resources of the information handling system 100 based on an operating state of the information handling system 100. For example, the reduced power environment 102 can maintain eminent domain over resources of the host environment 114. As such, the reduced power environment 102 can control aspects of resources of the host environment 114. For example, the reduced power environment 102 can access, enable, modify, operating states of the local shared resources within the host environment 114, and can maintain primary control of the resources of the host environment 114. In other forms, the host environment 114 can maintain eminent domain over resources of the reduced power environment 102. For example, the host environment 114 can access, enable, modify, operating states of the local shared resources within the reduced power environment 102, and can maintain primary control of the resources of the reduced power environment 114. As such, the state controller 108 can initiate, maintain, and alter primary control of resources within the information handling system 100 to be used by the reduced power environment 102, the host environment 114, various other operating environments, or any combination thereof.

Figure 2:
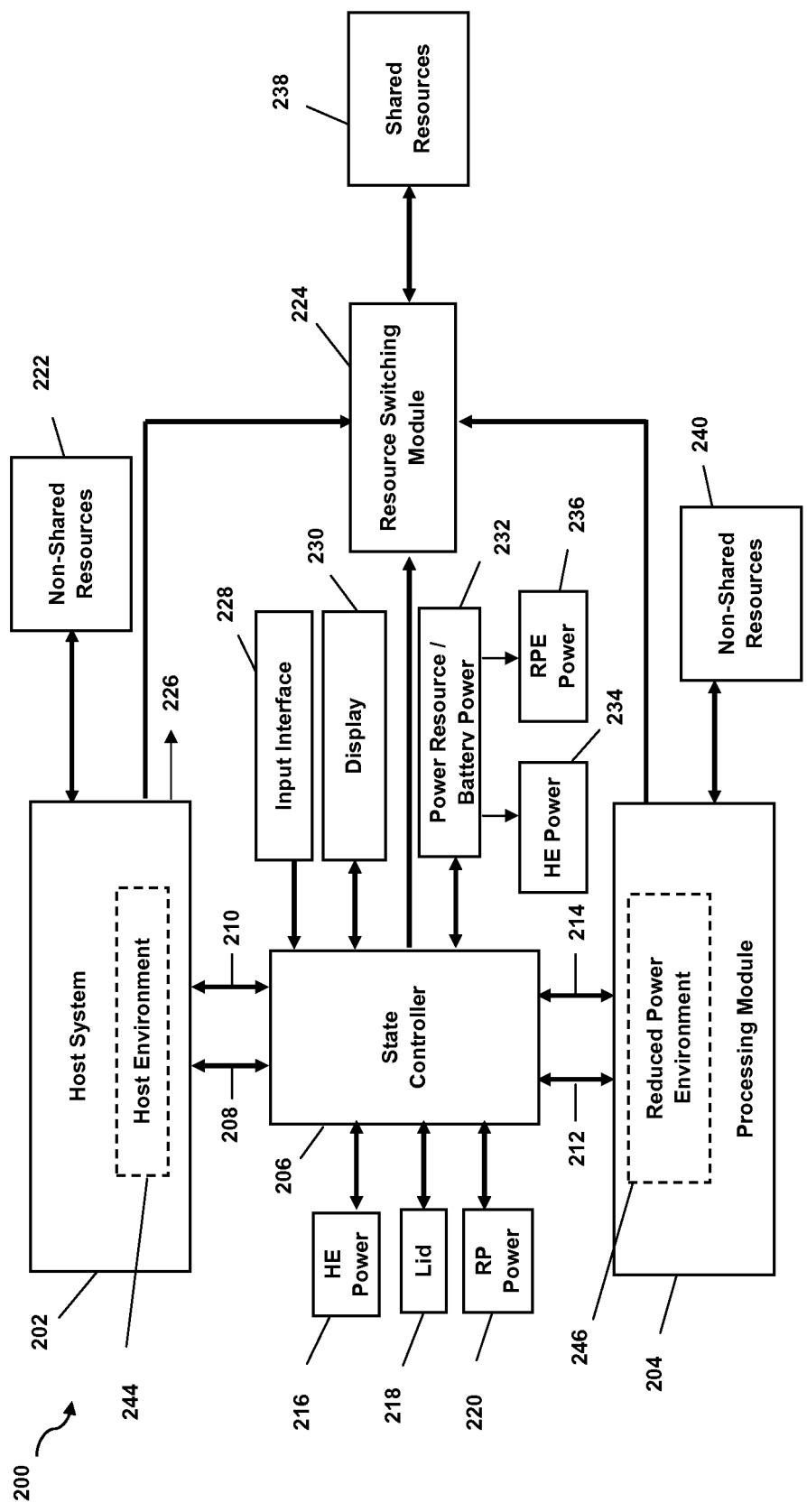
FIG. 2 illustrates a functional block diagram of an information handling system employing a reduced power environment and a host environment according to an aspect of the disclosure.

FIG. 2 illustrates a functional block diagram of an information handling system employing a reduced power environment according to an aspect of the disclosure. An information handling system, generally illustrated at 200, can also be realized, in whole or in part, as the information handling system 100 illustrated in FIG. 1, the information handling system 1200 illustrated in FIG. 12, other information handling systems not expressly illustrated or described, or any combination thereof.

According to an aspect, the information handling system, generally depicted at 200, can include a host system 202 that can include a host CPU, a host CPU chipset, memory, a host operating system and various other resources and components which can be combined to form an information handling system (not illustrated). The host system 202 can also include BIOS (not illustrated) operable to enable resources accessible to the host system 202. The information handling system 200 can also include a processing module 204, that can include a CPU, a CPU chipset, memory, and an operating system (not illustrated). The processing module 204 can also include a second BIOS (not illustrated) operable to enable resources accessible to the processing module 204. In an aspect, the processing module 204 can include BIOS extensions or inputs that can be commonly used by the host system 202.

According to an aspect, the host system 202 and the processing module 204 can be coupled to a state controller 206 configured to enable resources that can be used as a part of a host environment 244 and a reduced power environment 246. For example, the host system 202 can be coupled to the state controller 206 using a bus 208 and a bus 210. In one form, the bus 208 can include a low pin count (LPC) bus and the bus 210 can include a system management bus (SMBUS). Other types of buses can also be employed. Additionally, the processing module 204 can be coupled to the state controller 206 using a bus 212 and a bus 214. In one form buses 208, 210, 212, 214 can include any combination of a personal system 2 (PS2) bus, an RS232 bus, a serial peripheral interface (SPI bus), SMBUS, LPC, or other types of buses, or any combination thereof.

According to an aspect, a peripheral interconnect (not illustrated) can also be coupled to the host system 202 and the processing module 204, such as a universal serial bus (USB), USB 3, PCI bus, base controller (BC) bus, a PCI express (PCIE) bus, Firewire®, Gigabit Ethernet, secure digital input output (SDIO), systems management (SM), a display bus, various other types of buses, or any combination thereof, that can be employed to connect the host system 202 to the processing module 204 as a peripheral device.

The host system 202 can also be coupled to non-shared resources 222 and a resources switching module 224. The reduced power environment 202 can be coupled to non-shared resources 226 and the resources switching module 224. According to an aspect, the non-shared resources 222 can include local resources that can be local to the host environment 204. Additionally, the non-shared resources 222 can be accessed on a limited basis by the processing module 204. Additionally, the processing module 204 can include the non-shared resources 240 local to the processing module 204 that can be accessed by the host system 202. According to an aspect, the state controller 206 can maintain a listing of the non-shared resources 222, 240, shared resources 238, and can further enable and disable access to each resource based on an operating state of the information handling system 200. The resource switching module 224 can further be coupled to one or more shared resources 238 accessible to the processing module 204 and the host processor 204.

The state controller 206 can also be coupled to an input interface 228 that can be coupled to any combination of, a keyboard, pointing device, touchpad, security module, etc. The state controller 206 can also be coupled to a display 230 such as flat screen or flat panel display, touch screen, or any combination thereof. According to an aspect, the display can include a backlight and ambient light sensing (ALS) capabilities. The state controller 206 can further be coupled to a power resource 232, which can also include a battery power source. The power resource 232 can include a host environment (HE) power 234 configured to power resources used to provide the host environment 244 of the host system 202. The power resource 232 can also include a reduced power environment (RPE) power 204 configured to power resourced used to provide the reduced power environment 246 of the processing module 204. Other outputs of the power resource 232 can also be used or enabled. Additionally, output of the HE power 234, RPE power 236, or any combination thereof can be increased or decreased as needed or desired to enable various resources of the information handling system 200.

According to another aspect, the information handling system 200 can also include an HE power input 216, a lid status input 218, and a processing module power input 220, coupled to the state controller 206. Each input can be used alone, or in combination, to enable the host environment 244, the reduced power environment 246, or any combination thereof. In a further aspect, the HE power input 216, RP power input 220, or any combination thereof can include a power button that can enable the information handling system 100. Additionally, the HE power input 216 and the RP power input 220 can be realized as the same button or input. In other forms, the RP power input 220 can be used to enable, disable, alter an operating state, or any combination thereof, of the processing module 204. The HE power input 216 can also be used to enable, disable, alter an operating state, or any combination thereof, of the host system 202.

According to a particular aspect, the host system 202 can be operated in a run-time operating mode, and can further access one or a combination of shared resources accessible to the processing module 204. For example, the host system 202 can offload processing to the processing module 204 by using the processing module 204 as a peripheral device. The state controller 206 can initiate enabling the processing module 204 as a peripheral resource or device to the host system 202, or as a stand-alone operating environment that operate independent of the host system 202.

According to an aspect, the state controller 206 can detect an operating condition of the host system 202 and the processing module 204. For example, a status listing that includes an operating status of various components of the information handling system 200 can be maintained by the state controller 206 and accessed as needed or desired. For example, the host system 202 can be disabled and associated component of the host system 202 can be powered down. As such, the processing module 204 can be enabled and associated resources.

Figure 3:
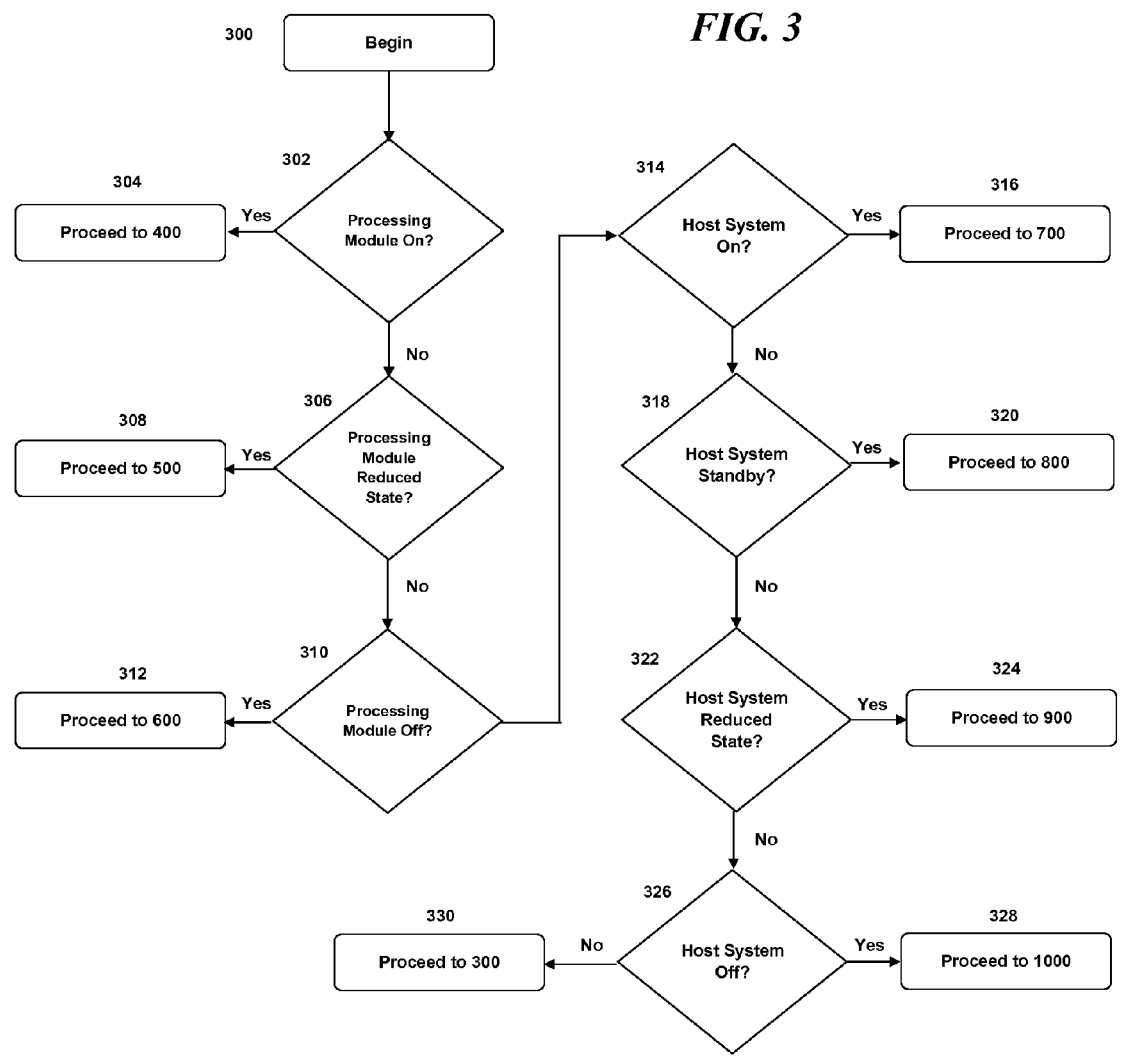
FIG. 3 illustrates a flow diagram of a method of enabling an operating state according to an aspect of the disclosure.

FIG. 3 illustrates a flow diagram of a method of enabling an operating state according to an aspect of the disclosure. FIG. 3 can be employed in whole, or in part, by the information handling system 100 depicted in FIG. 1, the information handling system 200 described in FIG. 2, the information handling system 1200 described in FIG. 12, or any other type of system, controller, device, module, processor, or any combination thereof, operable to employ all, or portions of, the method of FIG. 3. Additionally, the method can be embodied in various types of encoded logic including software, firmware, hardware, or other forms of digital storage mediums, computer readable mediums, or logic, or any combination thereof, operable to provide all, or portions, of the method of FIG. 3. The method of FIG. 3 can also be used with any combination of flow diagrams disclosed within such as the FIGS. 4-11 described within.

The method can begin generally at block 300. At decision block 302, a processing module power on operating state request can be detected. If a processing module power on state request can be detected, the method can proceed to block 304 and to block 400 of FIG. 4 to initiate a processing module power on operating state.

If at decision block 302 a processing module power on state request may not be detected, the method can proceed to decision block 306 and detects whether a processing module reduced state request can be detected. If a processing module reduced state request can be detected, the method can proceed to block 308 and to block 500 of FIG. 5 to initiate a processing module reduced state.

If at decision block 306 a processing module reduced state request may not be detected, the method can proceed to decision block 310 and detects whether a processing module power off state request can be detected. If a processing module power off state request can be detected, the method can proceed to block 312 and to block 600 of FIG. 6 to initiate a processing module off state.

If at decision block 310 a processing module power off state request may not be detected, the method can proceed to decision block 314 and detects whether a host system on state request can be detected. If a host system on state request can be detected, the method can proceed to block 316 and to block 700 of FIG. 7 to initiate a host system on state.

If at decision block 314 a host system on state request may not be detected, the method can proceed to decision block 318 and detects whether a host system standby state request can be detected. If a host system standby state request can be detected, the method can proceed to block 320 and to block 800 of FIG. 8 to initiate a host system standby state.

If at decision block 318 a host system standby state request may not be detected, the method can proceed to decision block 322 and detects whether a host system reduced state request can be detected. If a host system reduced state request can be detected, the method can proceed to block 324 and to block 900 of FIG. 9 to initiate a host system reduced state.

If at decision block 322 a host system reduced state request may not be detected, the method can proceed to decision block 326 and detects whether a host system off state request can be detected. If a host system off state request can be detected, the method can proceed to block 328 and to block 1000 of FIG. 10 to initiate a host system off state. If at decision block 326 a host system off request may not be detected, the method can proceed to block 330 and to block 300 and repeats.

Figure 4:
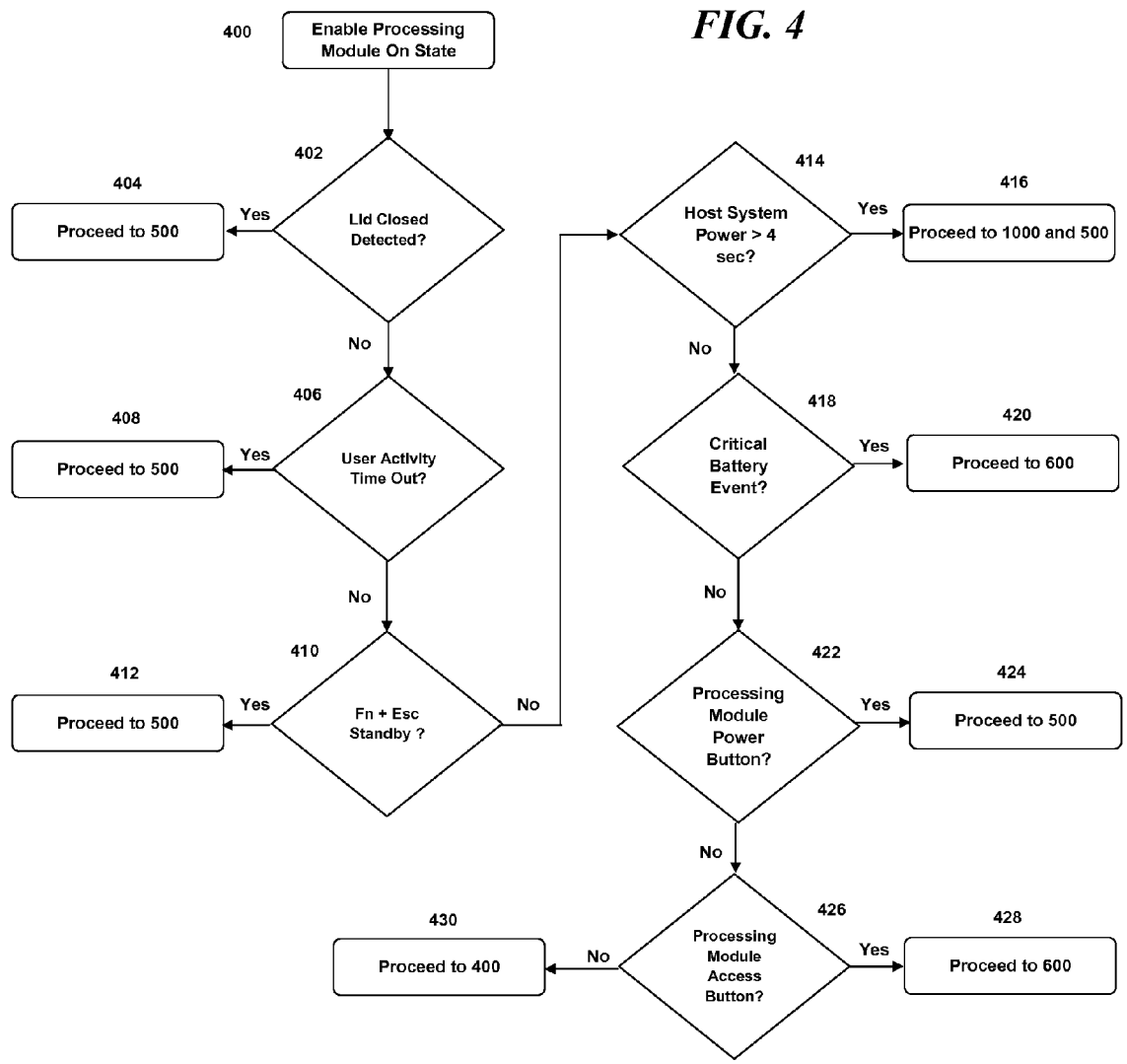
FIG. 4 illustrates a flow diagram of a processing module power on state routine according to an aspect of the disclosure.

FIG. 4 illustrates a flow diagram of a processing module power on state routine according to an aspect of the disclosure. FIG. 4 can be employed in whole, or in part, by the information handling system 100 depicted in FIG. 1, the information handling system 200 described in FIG. 2, the information handling system 1200 described in FIG. 12, or any other type of system, controller, device, module, processor, or any combination thereof, operable to employ all, or portions of, the method of FIG. 4. Additionally, the method can be embodied in various types of encoded logic including software, firmware, hardware, or other forms of digital storage mediums, computer readable mediums, or logic, or any combination thereof, operable to provide all, or portions, of the method of FIG. 4. The method of FIG. 4 can also be used with any combination of flow diagrams disclosed within such as the FIGS. 3, 5-11 described within.

The method can begin generally at block 400. At decision block 402, a lid closed event can be detected. If a lid closed event can be detected, the method can proceed to block 404 and to block 500 of FIG. 5.

If at decision block 402 a lid closed event may not be detected, the method can proceed to decision block 406 and detects whether a user activity time out event can be detected. If a user activity time out event can be detected, the method can proceed to block 408 and to block 500 of FIG. 5.

If at decision block 406 a user activity time out event may not be detected, the method can proceed to decision block 410 and detects whether a FN+ESC standby request can be detected. If a FN+ESC standby request can be detected, the method can proceed to block 512 and to block 500 of FIG. 5.

If at decision block 410 a FN+ESC standby request may not be detected, the method can proceed to decision block 414 and detects whether a host system power button may be activated greater than four (4) seconds. If a host system power button may be activated greater than four (4) seconds can be detected, the method can proceed to block 416 and to block 1000 of FIG. 10 and to block 500 of FIG. 5.

If at decision block 414, a host system power button activated greater than four (4) seconds may not be detected, the method can proceed to decision block 418 and detects whether a critical battery event can be detected. If a critical battery event can be detected, the method can proceed to block 420 and to block 600 of FIG. 6.

If at decision block 418 a critical battery event may not be detected, the method can proceed to decision block 422 and detects whether a processing module power button activation can be detected. If a processing module power button activation can be detected, the method can proceed to block 424 and to block 500 of FIG. 5.

If at decision block 422 a processing module power button activation may not be detected, the method can proceed to decision block 426 and detects whether a reduced power environment access button activation can be detected. If reduced power environment access button activation can be detected, the method can proceed to block 428 and to block 600 of FIG. 6. If at decision block 426 reduced power environment access button activation may not be detected, the method can proceed to block 430 and to block 400 and repeats.

Figure 5:
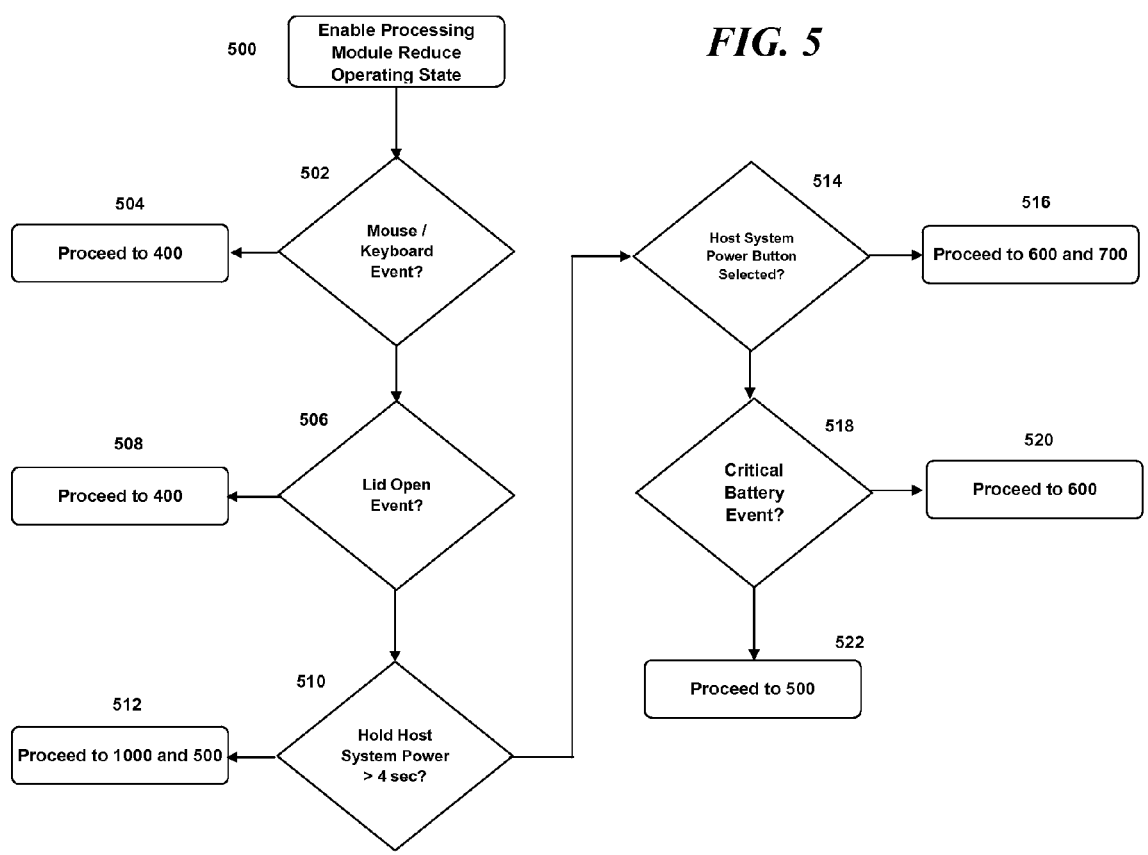
FIG. 5 illustrates a flow diagram of a reduced power environment reduced power state routine according to an aspect of the disclosure.

FIG. 5 illustrates a flow diagram of a reduced power environment reduced power state routine according to an aspect of the disclosure. FIG. 5 can be employed in whole, or in part, by the information handling system 100 depicted in FIG. 1, the information handling system 200 described in FIG. 2, the information handling system 1200 described in FIG. 12, or any combination thereof, operable to employ all, or portions of, the method of FIG. 5. Additionally, the method can be embodied in various types of encoded logic including software, firmware, hardware, or other forms of digital storage mediums, computer readable mediums, or logic, or any combination thereof, operable to provide all, or portions, of the method of FIG. 5. The method of FIG. 5 can also be used with any combination of flow diagrams disclosed within such as the FIGS. 3-4, 6-11 described within.

The method can begin generally at block 500. At decision block 502, a mouse event, keyboard event or any combination thereof event can be detected. If a mouse event or keyboard event can be detected, the method can proceed to block 504 and to block 400 of FIG. 4.

If at decision block 502 a mouse event or keyboard event may not be detected, the method can proceed to decision block 506 and detects whether a lid open event can be detected. If a lid open event can be detected, the method can proceed to block 508 and to block 400 of FIG. 4.

If at decision block 506 a lid open event may not be detected, the method can proceed to decision block 510 and detects whether a host system power button may be activated greater than four (4) seconds. If a host system power button may be activated greater than four (4) seconds, the method can proceed to block 512 and to block 1000 of FIG. 10 and block 500 of FIG. 5.

If at decision block 510 a host system power button may not be activated greater than four (4) seconds, the method can proceed to decision block 514 and detects whether a host system power button may be activated. If a host system power button may be detected, the method can proceed to block 516 and to block 600 of FIG. 6 and to block 700 of FIG. 7.

If at decision block 514, a host system power button activation may not be detected, the method can proceed to decision block 518 and detects whether a critical battery event can be detected. If a critical battery event can be detected, the method can proceed to block 520 and to block 600 of FIG. 6.

If at decision block 518 a critical battery event may not be detected, the method can proceed to block 522 and to block 500 and repeats.

Figure 6:
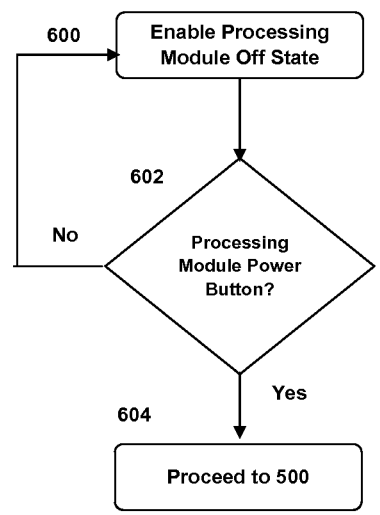
FIG. 6 illustrates a flow diagram of a reduced power environment off state routine according to an aspect of the disclosure.

FIG. 6 illustrates a flow diagram of a reduced power environment off state routine according to an aspect of the disclosure. FIG. 6 can be employed in whole, or in part, by the information handling system 100 depicted in FIG. 1, the information handling system 200 described in FIG. 2, the information handling system 1200 described in FIG. 12, or any other type of system, controller, device, module, processor, or any combination thereof, operable to employ all, or portions of, the method of FIG. 6. Additionally, the method can be embodied in various types of encoded logic including software, firmware, hardware, or other forms of digital storage mediums, computer readable mediums, or logic, or any combination thereof, operable to provide all, or portions, of the method of FIG. 6. The method of FIG. 6 can also be used with any combination of flow diagrams disclosed within such as the FIGS. 3-5, 7-11 described within.

The method can begin generally at block 600. At decision block 602, a processing module power button activation event can be detected. If a processing module power button activation event can be detected, the method can proceed to block 604 and to block 500 of FIG. 5. If at decision block 602 a processing module power button activation event may not be detected, the method can proceed to block 300 and repeats.

Figure 7:
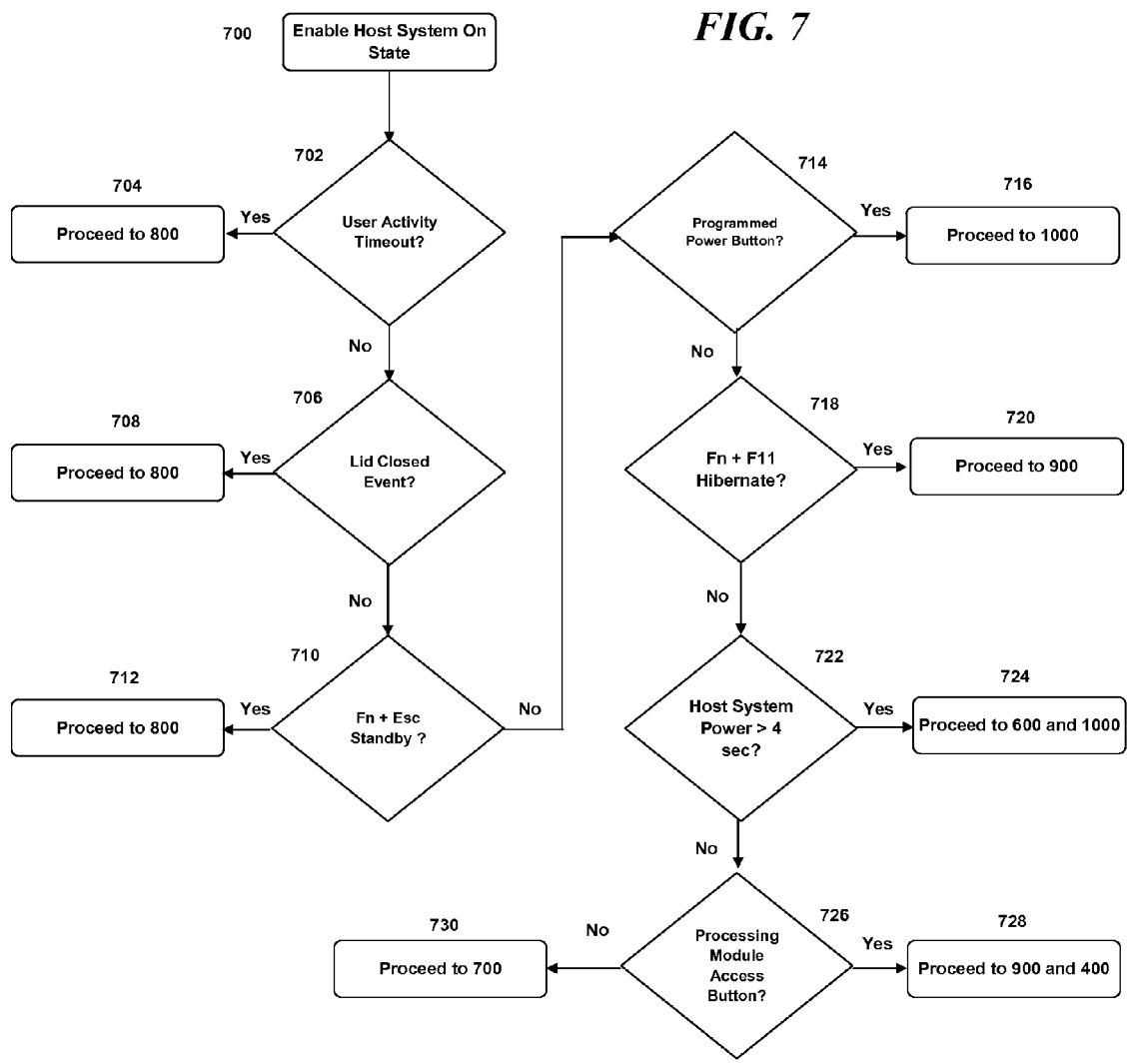
FIG. 7 illustrates a flow diagram of a host environment power on state routine according to an aspect of the disclosure.

FIG. 7 illustrates a flow diagram of a host system power on state routine according to an aspect of the disclosure. FIG. 7 can be employed in whole, or in part, by the information handling system 100 depicted in FIG. 1, the information handling system 200 described in FIG. 2, the information handling system 1200 described in FIG. 12, or any other type of system, controller, device, module, processor, or any combination thereof, operable to employ all, or portions of, the method of FIG. 7. Additionally, the method can be embodied in various types of encoded logic including software, firmware, hardware, or other forms of digital storage mediums, computer readable mediums, or logic, or any combination thereof, operable to provide all, or portions, of the method of FIG. 7. The method of FIG. 7 can also be used with any combination of flow diagrams disclosed within such as the FIGS. 3-6, 8-11 described within.

The method can begin generally at block 700. At decision block 702, a user activity time out event can be detected. If a user activity time out event can be detected, the method can proceed to block 704 and to block 800 of FIG. 8.

If at decision block 702 a user activity time out event may not be detected, the method can proceed to decision block 706 and detects whether a lid closed event can be detected. If a lid closed event can be detected, the method can proceed to block 708 and to block 800 of FIG. 8. For example, the operating system can include settings that can alter the manner upon which the system changes to a host system standby state. According to an aspect, the OS can include an S3 condition setting, an S4 condition setting, can include a S5 condition setting, or various settings as desired.

If at decision block 706 a lid closed event may not be detected, the method can proceed to decision block 710 and detects whether a FN+ESC standby request can be detected. If a FN+ESC standby request can be detected, the method can proceed to block 712 and to block 800 of FIG. 8.

If at decision block 810 a FN+ESC standby request may not be detected, the method can proceed to decision block 714 and detects whether a programmed power button may be activated. If a programmed power button may be activated, the method can proceed to block 716 and to block 1000 of FIG. 10.

If at decision block 714, a programmed power button activation may not be detected, the method can proceed to decision block 718 and detects whether a 'Fn+F11' hibernate event can be detected. If a Fn+F11 hibernate event can be detected, the method can proceed to block 720 and to block 900 of FIG. 9.

If at decision block 718 a Fn+F11 hibernate event may not be detected, the method can proceed to decision block 722 and detects whether a host system power button may be activated greater than four (4) seconds. If a host system power button may be activated greater than four (4) seconds can be detected, the method can proceed to block 724 and to block 600 of FIG. 6 and to block 1000 of FIG. 10.

If at decision block 722 a host system power button may not be activated greater than four (4) seconds, the method can proceed to decision block 726 and detects whether a reduced power environment access button activation can be detected. If reduced power environment access button activation can be detected, the method can proceed to block 728 and to block 900 of FIG. 9 and to block 400 of FIG. 4. If at decision block 426 reduced power environment access button activation may not be detected, the method can proceed to block 730 and to block 700 and repeats.

Figure 8:
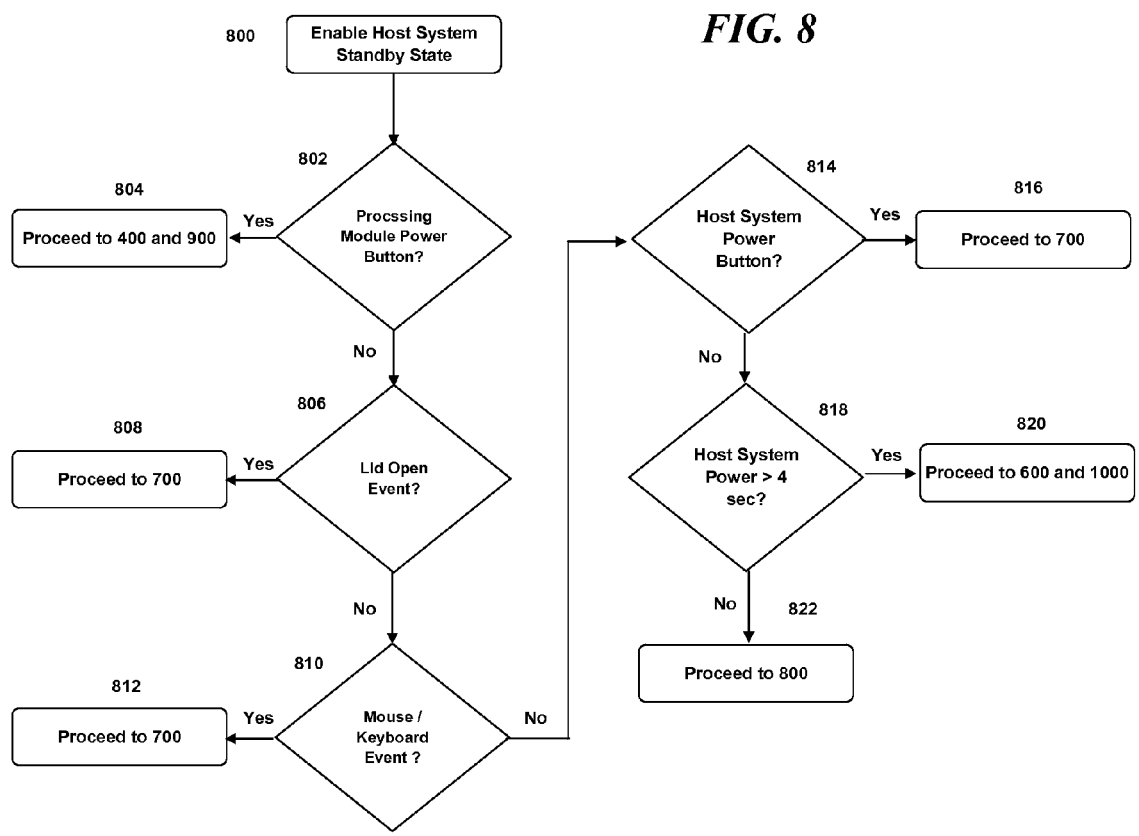
FIG. 8 illustrates a flow diagram of a host environment standby state routine according to an aspect of the disclosure.

FIG. 8 illustrates a flow diagram of a host system standby state routine according to an aspect of the disclosure. FIG. 8 can be employed in whole, or in part, by the information handling system 100 depicted in FIG. 1, the information handling system 200 described in FIG. 2, the information handling system 1200 described in FIG. 12, or any combination thereof, operable to employ all, or portions of, the method of FIG. 8. Additionally, the method can be embodied in various types of encoded logic including software, firmware, hardware, or other forms of digital storage mediums, computer readable mediums, or logic, or any combination thereof, operable to provide all, or portions, of the method of FIG. 8. The method of FIG. 8 can also be used with any combination of flow diagrams disclosed within such as the FIGS. 3-7, 9-11 described within.

The method can begin generally at block 800. At decision block 802, a processing module power button event can be detected. If a processing module power button event can be detected, the method can proceed to block 804 and to block 400 of FIG. 4 and to block 900 of FIG. 9.

If at decision block 802 a processing module power button event may not be detected, the method can proceed to decision block 806 and detects whether a lid open event can be detected. If a lid open event can be detected, the method can proceed to block 808 and to block 700 of FIG. 7. For example, an OS setting could be used enable the host system from an OS preferred setting when the host system is placed in a reduced operating state.

If at decision block 806 a lid open event may not be detected, the method can proceed to decision block 810 and detects whether a mouse event, keyboard event, or any combination thereof can be detected. If mouse event or keyboard event can be detected, the method can proceed to block 812 and to block 700 of FIG. 7.

If at decision block 810 a mouse event or keyboard event may not be detected, the method can proceed to decision block 814 and detects whether a host system power button may be activated. If a host system power button may be activated, the method can proceed to block 816 and to block 700 of FIG. 7.

If at decision block 814, a host system power button event may not be detected, the method can proceed to decision block 818 and detects whether a host system power button may be activated greater than four (4) seconds. If a host system power button may be activated greater than four (4) seconds, the method can proceed to block 820 and to block 600 of FIG. 6, and to block 1000 of FIG. 10.

If at decision block 818 a host system power button may not be activated greater than four (4) seconds, the method can proceed to decision block 822 and to block 800 and repeats.

Figure 9:
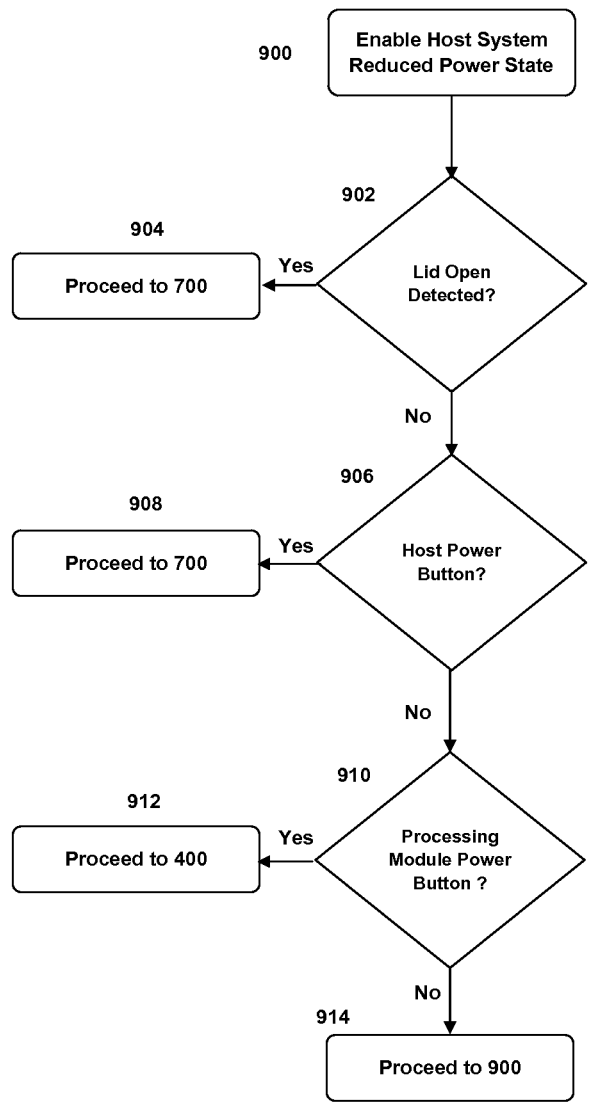
FIG. 9 illustrates a flow diagram of a host environment hibernate state routine according to an aspect of the disclosure.

FIG. 9 illustrates a flow diagram of a host system hibernate state routine according to an aspect of the disclosure. FIG. 9 can be employed in whole, or in part, by the information handling system 100 depicted in FIG. 1, the information handling system 200 described in FIG. 2, the information handling system 1200 described in FIG. 12, or any other type of system, controller, device, module, processor, or any combination thereof, operable to employ all, or portions of, the method of FIG. 9. Additionally, the method can be embodied in various types of encoded logic including software, firmware, hardware, or other forms of digital storage mediums, computer readable mediums, or logic, or any combination thereof, operable to provide all, or portions, of the method of FIG. 9. The method of FIG. 9 can also be used with any combination of flow diagrams disclosed within such as the FIGS. 3-8, 10-11 described within.

The method can begin generally at block 900. At decision block 902, a lid open event can be detected. If a lid open event can be detected, the method can proceed to block 904 and to block 700 of FIG. 7.

If at decision block 902 a lid open event may not be detected, the method can proceed to decision block 906 and detects whether a host power button event can be detected. If a host power button event can be detected, the method can proceed to block 908 and to block 700 of FIG. 7.

If at decision block 906 a host power button event may not be detected, the method can proceed to decision block 910 and detects whether a processing module power button event can be detected. If a processing module power button event can be detected, the method can proceed to block 912 and to block 400 of FIG. 4. If a processing module power button event may not be detected, the method can proceed to block 900 and repeats.

Figure 10:
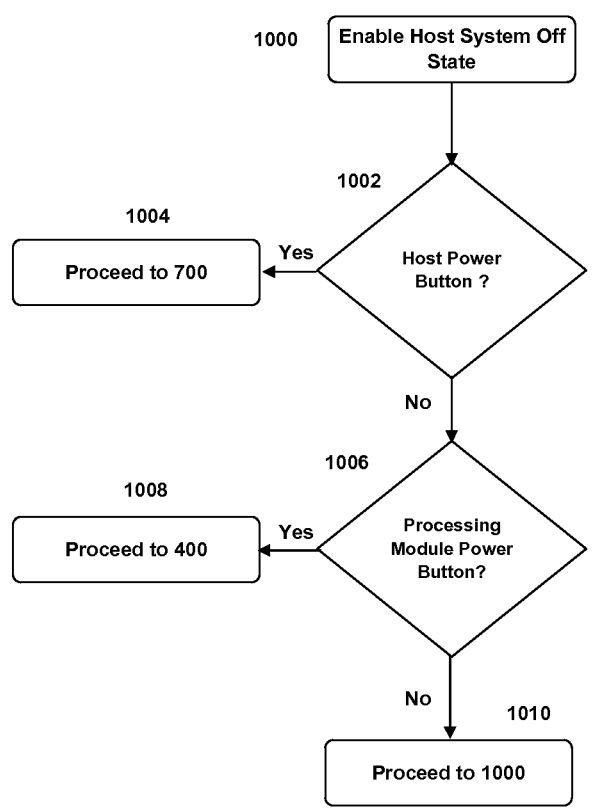
FIG. 10 illustrates a flow diagram of a host environment power off state routine according to an aspect of the disclosure.

FIG. 10 illustrates a flow diagram of a host system power off state routine according to an aspect of the disclosure. FIG. 10 can be employed in whole, or in part, by the information handling system 100 depicted in FIG. 1, the information handling system 200 described in FIG. 2, the information handling system 1200 described in FIG. 12, or any other type of system, controller, device, module, processor, or any combination thereof, operable to employ all, or portions of, the method of FIG. 10. Additionally, the method can be embodied in various types of encoded logic including software, firmware, hardware, or other forms of digital storage mediums, computer readable mediums, or logic, or any combination thereof, operable to provide all, or portions, of the method of FIG. 10. The method of FIG. 10 can also be used with any combination of flow diagrams disclosed within such as the FIGS. 3-9, 11 described within.

The method can begin generally at block 1000. At decision block 1002, a host power event can be detected. If a host power event can be detected, the method can proceed to block 1004 and to block 700 of FIG. 7.

If at decision block 1002 a host power event may not be detected, the method can proceed to decision block 1006 and detects whether a processing module power button event can be detected. If a processing module power button event can be detected, the method can proceed to block 1008 and to block 400 of FIG. 4. If a processing module power button event may not be detected, the method can proceed to block 1010 and to block 1000 and repeats.

Figure 11:
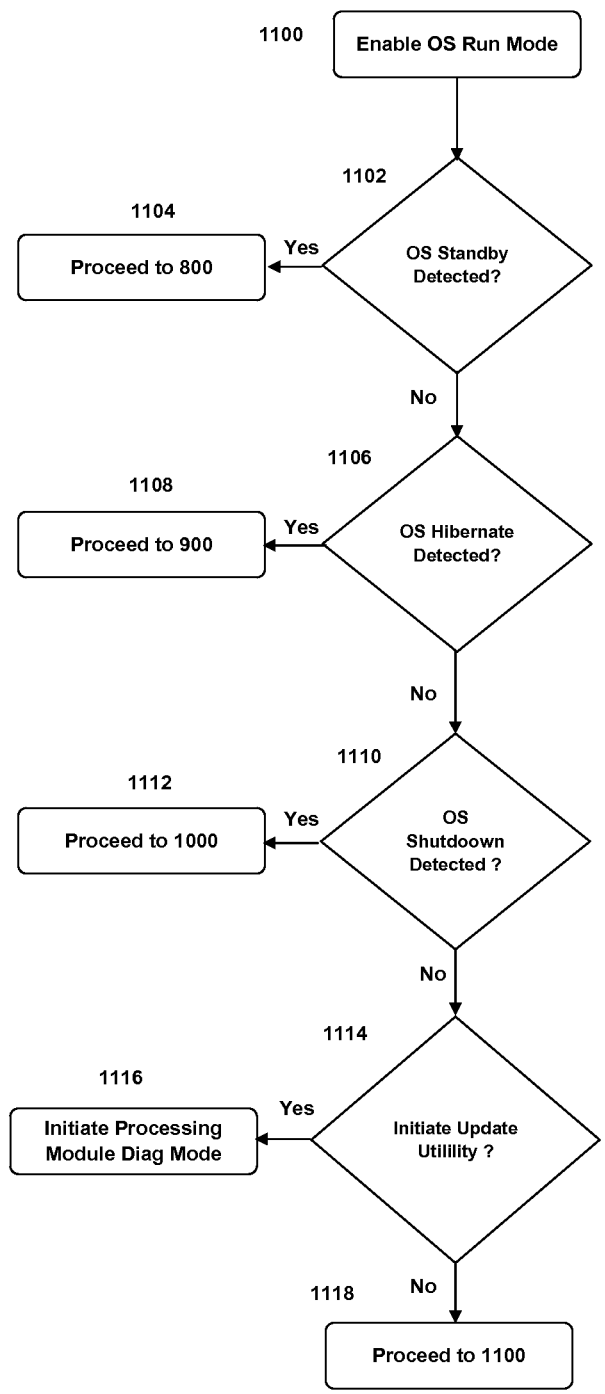
FIG. 11 illustrates a flow diagram of an operating system run mode routine according to an aspect of the disclosure.

FIG. 11 illustrates a flow diagram of an operating system run mode routine according to an aspect of the disclosure. FIG. 11 can be employed in whole, or in part, by the information handling system 100 depicted in FIG. 1, the information handling system 200 described in FIG. 2, the information handling system 1200 described in FIG. 12, or any other type of system, controller, device, module, processor, or any combination thereof, operable to employ all, or portions of, the method of FIG. 11. Additionally, the method can be embodied in various types of encoded logic including software, firmware, hardware, or other forms of digital storage mediums, computer readable mediums, or logic, or any combination thereof, operable to provide all, or portions, of the method of FIG. 11. The method of FIG. 11 can also be used with any combination of flow diagrams disclosed within such as the FIGS. 3-10 described within.

The method can begin generally at block 1100 as an operating system can be used in a run operating mode. At decision block 1102, an OS standby event can be detected. If a an OS standby event can be detected, the method can proceed to block 1104 and to block 800 of FIG. 8.

If at decision block 1102 an OS standby event may not be detected, the method can proceed to decision block 1106 and detects whether an OS hibernate event can be detected. If an OS hibernate event can be detected, the method can proceed to block 1108 and to block 900 of FIG. 9.

If at decision block 1106 an OS hibernate event may not be detected, the method can proceed to decision block 1110 and detects whether an OS shutdown event can be detected. If an OS shutdown event can be detected, the method can proceed to block 1112 and to block 1000 of FIG. 10.

If at decision block 1110 an OS shutdown event may not be detected, the method can proceed to decision block 1114 and detects whether an initiate update utility event may be detected. If an initiate update utility event may be detected, the method can proceed to block 1116 and initiates a reduced power environment diagnostic operating mode. If at decision block 1114, an initiate update utility event may not be detected, the method can proceed to decision block 1118 and to block 1100 and repeats.

Figure 12:
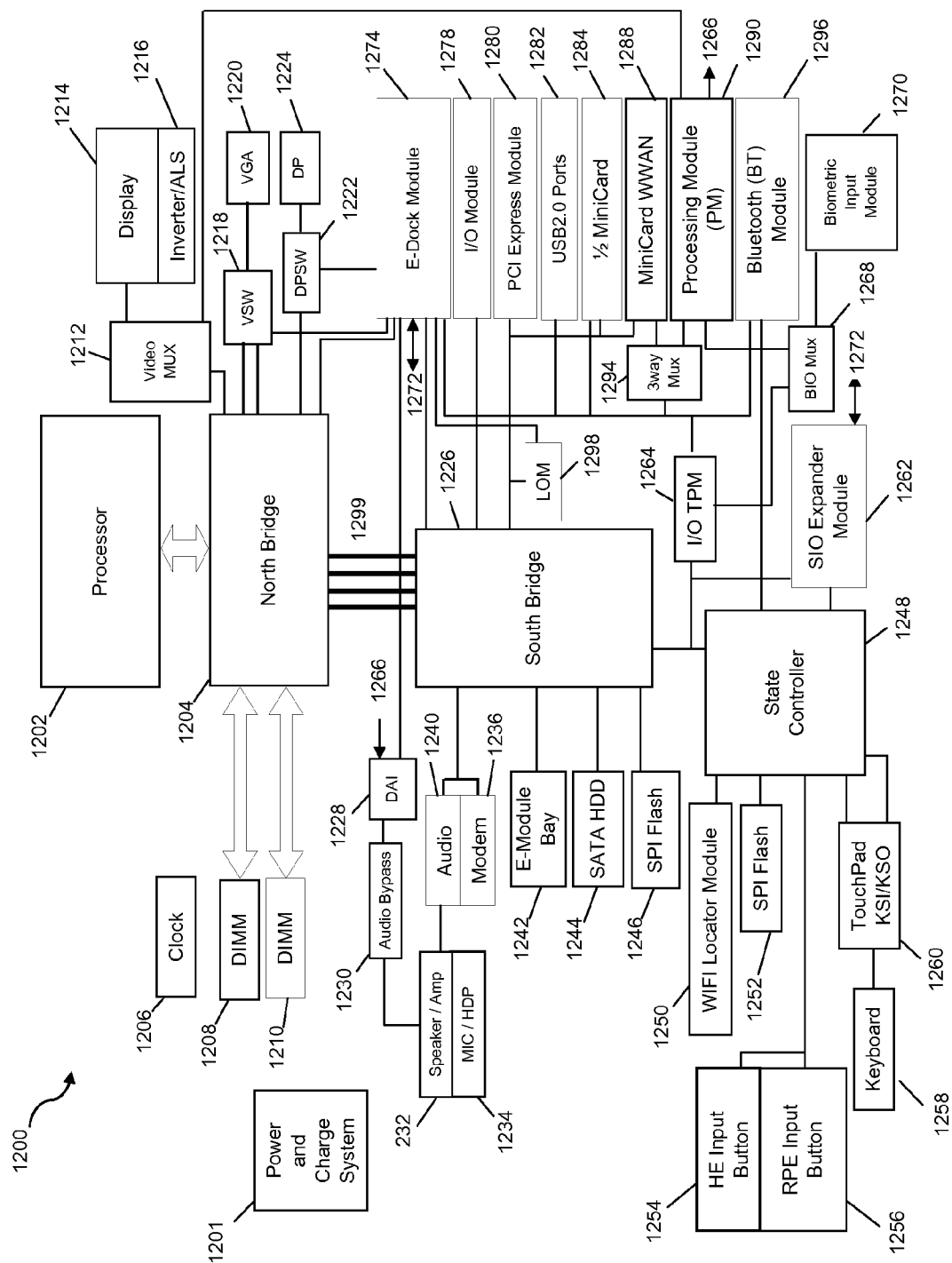
FIG. 12 illustrates a functional block diagram of an information handling system operable to use a reduced power environment and a host environment using according to an aspect of the disclosure.

FIG. 12 illustrates a functional block diagram of an information handling system operable to employ a reduced power environment and a host environment according to an aspect of the disclosure. An information handling system, generally illustrated at 1200, can also be realized, in whole or in part, as the information handling system 100 illustrated in FIG. 1, the information handling system 200 illustrated in FIG. 2, other information handling systems not expressly illustrated or described, or any combination thereof.

The information handling system 1200 can include a processor 1202, coupled to a north bridge 1204. A clock 1206 can output a timing signal to the processor 1202 and other components or resources of the information handling system 1200 as needed or required. The north bridge 1204 can be further coupled to a dual in-line memory module (DIMM) 1208 and a DIMM 1210. The north bridge 1204 can also be coupled to a video multiplexer (Video MUX) 1212 operable to multiplex and output video signals to be displayed using a display 1214. The display 1214 can include an inverter and automatic light sensor (ALS) module 1216. The north bridge 1204 can be further coupled to a video switch (VSW) module 1218 and a video graphics array (VGA) port 1220. A display port (DP) 1224 can be coupled to a display port switch (DPSW) 1222 operable to be coupled to the north bridge 1204, and a docking module such as an E-Dock module 1274 or other docking modules. For example, the E-Dock module 1274 or docking module can be used to expand resources of the information handling system 1200, and in various forms, enable access to a battery or charge source, a media slice, an I/O box, a printer interface, or various other resources that can be accessed when docking the information handling system 1200 to a docking module.

The information handling system 1200 can also include a south bridge 1226 coupled to the north bridge 1204 using a data bus 1299. A digital audio interface (DAI) module 1228 can receive a digital audio signal from an input source 1266. In an aspect, a remote reduced power environment 1290 or other modules can be coupled to the DAI 1228 to input a digital audio signal as the input source 1266. For example, the DAI module 1228 can also be coupled to an E-Dock source 1274. An audio bypass 1230 can be further coupled to a speaker and amplifier 1232, and a microphone and headphone (MIC/HDP) 1234. The south bridge 1226 can also be coupled to a modem 1236 such as an RJ-11 or plain old telephone system (POTS) enabled modem, and an audio output module 1240 operable to couple audio output signals using the south bridge 1226.

The south bridge 1226 can be coupled to the E-Module bay 1242 which can include a bay or cavity that can be used to enable couple and decouple resources that can access an internal bus of the information handling system 1200 and can be further coupled to the south bridge 1226. For example, the E-Module bay 1242 can be coupled to the south bridge 1226 using a multiplexer such as 3-way Mux 1294 operable to couple a resource coupled to E-Module bay 1242. Examples of resources can include disk drives, optical drives, batteries, I/O expander modules, smart card readers, and various combinations thereof. The information handling system 1200 further includes a serial advanced technology attachment hard disk drive (SATA HDD) 1244, and a serial peripheral interface (SPI) flash memory 1246. The south bridge 1226 can also be coupled to a state controller 1248. The state controller 1248 can be coupled to a wireless fidelity (WIFI) locator module 1250 which can refer to any type of 802.11x or any other short-range wireless communication. The state controller 1248 can also be coupled to an SPI flash module 1252, a host environment input power 1254, and a reduced power environment input button 1256 that can include one or more resource access buttons. The state controller 1248 can also be coupled to a keyboard 1258 and touchpad and KSI/KSO module 1260. An SIO expander module 1262 can also be coupled to the state controller 1248 and can further be coupled to an I/O trusted platform module (TPM) 1264. The I/O TPM 1264 can further be coupled to a biometric multiplexer (BIO MUX) 1268, and a biometric input 1270 operable to detect user biometrics (e.g. fingerprint recognition, face recognition, iris detection, EKG/heart monitoring, etc.). The information handling system 1200 can also include a security engine (not illustrated) that can be coupled to the biometric inputs using the PM 1290 that can enable and disable access to portions or all of the information handling system 1200. According to an aspect, the north bridge 1204, the south bridge 1226, various other components, or any combination thereof can be realized as the same chipset or device and need not be provided as a separate components.

According to an aspect, the E-Dock module 1274 can also be coupled to the state controller 1248 and SIO expander module 1262 via interface 1272. The south bridge 1226 can further be coupled to an I/O module 1278, a peripheral computer interconnect (PCI) express module 1280 using a PCI express bus. The south bridge 1226 can further be coupled to universal serial bus (USB) 2.0 access ports 1282 via a host USB bus. A V2 Mini Card module 1284 and a Minicard wireless wide area network (WWAN) module 1288 can also be coupled to the south bridge 1226 using a PCI express bus.

The information handling system 1200 can further include a reduced power environment PM 1290. PM 1290 can be realized as reduced power environment 102 described in FIG. 1, PM 400 described in FIG. 4, PM 502 described in FIG. 5, or any other module as needed or desired. PM 1290 can further be configured to output a video signal to the video MUX 1212 to output to the display 1214. The PM 1290 can also be coupled to a three (3) way multiplexer 1294. The three (3) way multiplexer 1294 can multiplex USB signals of the Minicard WWAN 1288, the PM 1290, and the USB bus coupled to the south bridge 1204. The south bridge 1226 can further be coupled to a Bluetooth (BT) module 1296 via the USB bus. The south bridge 1226 can also be coupled to a local area network (LAN) on Motherboard (LOM) 1298 via a PCI express bus of the information handling system 1200. The LOM 1298 can also be coupled to the PCI express module 1280. The information handling system 1200 also includes a power and charge system 1201 operable to distribute power to each component of the information handling system 1200, and charge rechargeable power sources of the information handling system 1200.

According to a further aspect, the PM 1290 can be coupled to a display interface 1205, display module 1203 and a display 1207. The display interface 1205 can further be coupled to the three (3) way MUX 1294. The display module 1203 can further be coupled to an input interface 1209 that can include an array of inputs. According to an aspect, the input interface 1209 can include a touch screen interface and controller coupled to the display module 1203 and display 1207. According to an aspect, the Minicard WWAN 1288 and the PM 1290 can be realized as the same module or device and can be coupled to the information handling system 1200 using a Minicard WWAN enabled interface.

According to an aspect, a resource profile can include a listing of resources of the information handling system 1200 sufficient to process an event. The PM 1204 and the state controller 1248 can initiate activation of resources based on the resource profile using the detected event, and resources available to process the event. As such, the information handling system 1200 need not be initialized to process all events, and a limited amount of resources can be activated.

In another form, the information handling system 1200 can detect a non-user initiated event communicated to an electronic device other than the information handling system 1200 during a reduced operating state of the information handling system 1200. For example, the PM 1290 can be configured to detect a message formatted to be received by a smart phone device, Blackberry device, or any type of electronic device configured to receive messages.

In an exemplary form, the information handling system 1200 can be operating in a low-power operating state that can include sufficient resources to detect a wireless signal. As such, the state controller 1248 can initiate enabling resources to process and output a response to the received wireless signal. As such, an operating environment to output a response to a message, such as a Blackberry message, can be enabled using a limited amount of resources without having to initialize additional resources of the information handling system 1200. For example, the PM 1290 in combination with the state controller 1248 can be used to enable access to the display 1214 to output a received message. Additionally, the keyboard 1258 or other input devices can be powered to enable a user to view and respond to a message. As such, a limited resource or reduced power operating environment can be generated to enable receipt and response to messages without having to initialize the information handling system 1200. In the manner, the information handling system 1200 can be realized as a laptop or notebook system that can be used to receive messages that may be intended for a Blackberry or other type of messaging device, thereby allowing a user to view messages using a larger display relative to the Blackberry device or smart phone device, and draft and respond to messages using the keyboard 1258 and the display 1214 as desired.

Note that not all of the activities described above in the general description or the examples are required, that a portion of a specific activity may not be required, and that one or more further activities may be performed in addition to those described. Still further, the order in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of utilizing an information handling system, comprising:
    detecting an event by a state controller configured to enable a plurality of operating states for a host system including a host system power on state and a host system power off state, and a plurality of processing module operating states including a processing module power on state and a processing module reduced operating state; and
    enabling by the state controller a respective operating state associated with the event in response to detecting the event, including:
        enabling the processing module power on state in response to detecting a processing module power on event, wherein the processing module controls a shared resource and a processing module non-shared resource in the processing module power on state; and
        enabling the processing module reduced operating state in response to detecting a processing module reduced operating event, wherein the processing module controls the shared resource in the processing module reduced operating state.

2. The method of claim 1, wherein the processing module power on event includes at least one of a keyboard event, a mouse event, a lid open event, and a processing module power button event.

3. The method of claim 1, wherein the processing module reduced operating event includes at least one of a lid closed event, a user activity time out event, a standby event, a processing module power button selection event over a first interval, and a host system power off button selection event over a second interval.

4. The method of claim 1, wherein:
enabling the state controller further includes enabling the host system power on state in response to detecting a host system power on event, the host system power on event including at least one of a lid open event, a mouse event, a keyboard event, and a host system power on button event.

5. The method of claim 1, wherein:
enabling the state controller further includes enabling the host system power off state in response to detecting a host system power off event, the host system power off event including at least one of an alternate programmed power button event, a host system power event over a first interval, a host system power off button selection event over a second interval, and an operating system shutdown event.

6. The method of claim 1, wherein:
the plurality of processing module operating states further includes a processing module power off state;
enabling the state controller further includes enabling the processing module power off state in response to detecting a processing module power off event, the processing module power off event including at least one of a processing module power button selection over event a first interval, a critical battery event, a processing module access button event, and a host system power on event.

7. The method of claim 1, wherein:
the plurality of processing module operating states further includes a processing module hibernate state;
enabling the state controller further includes enabling the processing module hibernate state in response to detecting a processing module hibernate event, the processing module hibernate event including a processing module hibernate setting event of a host operating system.

8. The method of claim 1, wherein:
the plurality of host system operating states further includes a host system standby state;
enabling the state controller further includes enabling the host system standby state in response to detecting a host system standby event, the host system standby event including at least one of a user activity timeout event, a lid closed event, and an operating system standby event.

9. The method of claim 1, wherein:
the plurality of host system operating states further includes a host system reduced operating state;
enabling the state controller further includes enabling the host system reduced operating state in response to detecting a host system reduced operating event, the host system reduced operating event including at least one of a host system hibernate event and a processing module power button event.

10. The method of claim 1, wherein:
the plurality of host system operating states further includes a host system hibernate state;
enabling the state controller further includes enabling the host system hibernate state in response to detecting a host system hibernate event, the host system hibernate event including at least one of a host system hibernate event, a processing module hibernate event, an operating system hibernate event, and a processing module power button event.

11. The method of claim 1, further comprising:
initiating a diagnostic operating mode at the processing module in response to a processing module update utility event.

12. An apparatus including a processor and a computer-readable medium for instructing the processor to carry out a method, the method comprising:
detecting an event at a state controller configured to enable a plurality of operating states for a host system including a host system power on state and a host system power off state, and a plurality of processing module operating states including a processing module power on state and a processing module reduced operating state; and
enabling a respective operating state associated with the event in response to detecting the event, including:
enabling the processing module power on state in response to detecting a processing module power on event, wherein the processing module controls a shared resource and a processing module non-shared resource in the processing module power on state; and
enabling the processing module reduced operating state in response to detecting a processing module reduced operating event, wherein the processing module controls the shared resource in the processing module reduced operating state.

13. The apparatus of claim 12, wherein the processing module power on event includes at least one of a keyboard event, a mouse event, a lid open event, and a processing module power button event.

14. The apparatus of claim 12, wherein the processing module reduced operating event includes at least one of a lid closed event, a user activity time out event, a standby event, a processing module power button selection event over a first interval, and a host system power off button selection event over a second interval.

15. The apparatus of claim 12, wherein:
the plurality of processing module operating states further includes a processing module power off state;
enabling the state controller further includes enabling the processing module power off state in response to detecting a processing module power off event, the processing module power off event including at least one of a processing module power button selection over event a first interval, a critical battery event, a processing module access button event, and a host system power on event.

16. The apparatus of claim 12, wherein:
the plurality of processing module operating states further includes a processing module hibernate state;
enabling the state controller further includes enabling the processing module hibernate state in response to detecting a processing module hibernate event, the processing module hibernate event including a processing module hibernate setting event of a host operating system.

17. The apparatus of claim 12, the method further comprising:
initiating a diagnostic operating mode at the processing module in response to a processing module update utility event.

18. An information handling system comprising:
a host system configured to enable a host environment operable to use a shared resource and a host environment non-shared resource;
a processing module configured to enable a reduced power environment operable to use the shared resource and a reduced power environment non-shared resource; and
a state controller configured to enable a plurality of state entries, wherein the state entries include a host system power on state and a host system power off state, a processing module power on state and a processing module reduced operating state, the state controller being further configured to:
  detect an event; and
  enable a respective operating state associated with the event in response to detecting the event, including to:
    enable the processing module power on state in response to detecting a processing module power on event, wherein the processing module controls the shared resource and the reduced power environment non-shared resource in the processing module power on state; and
    enable the processing module reduced operating state in response to detecting a processing module reduced operating event, wherein the processing module controls the shared resource in the processing module reduced operating state.

19. The information handling system of claim 18, wherein the processing module power on event includes at least one of a keyboard event, a mouse event, a lid open event, and a processing module power button event.

20. The information handling system of claim 18, wherein the processing module reduced operating event includes at least one of a lid closed event, a user activity time out event, a standby event, a processing module power button selection event over a first interval, and a host system power off button selection event over a second interval.

* * * * *